(12) United States Patent
Yoshikawa et al.

(10) Patent No.: US 11,179,905 B2
(45) Date of Patent: Nov. 23, 2021

(54) METHOD AND DEVICE FOR MANUFACTURING TIRE

(71) Applicant: The Yokohama Rubber Co., LTD., Tokyo (JP)

(72) Inventors: Tomohiro Yoshikawa, Hiratsuka (JP); Taisuke Kimura, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 17/052,122

(22) PCT Filed: Mar. 25, 2019

(86) PCT No.: PCT/JP2019/012336
§ 371 (c)(1),
(2) Date: Oct. 30, 2020

(87) PCT Pub. No.: WO2019/211955
PCT Pub. Date: Nov. 7, 2019

(65) Prior Publication Data
US 2021/0138748 A1    May 13, 2021

(30) Foreign Application Priority Data

May 1, 2018  (JP) .............................. JP2018-088324

(51) Int. Cl.
*B29D 30/06*    (2006.01)
*B29D 30/00*    (2006.01)

(52) U.S. Cl.
CPC ..... *B29D 30/0603* (2013.01); *B29D 30/0662* (2013.01); *B29D 2030/0066* (2013.01); *B29D 2030/0675* (2013.01)

(58) Field of Classification Search
CPC ............ B29D 30/0603; B29D 30/0633; B29D 2030/0066; B29D 2030/0634;
(Continued)

(56) References Cited

U.S. PATENT DOCUMENTS 6,417,918 B1    7/2002  Anno et al.
6,514,441 B1    2/2003  Tanaka et al.
(Continued)

FOREIGN PATENT DOCUMENTS

JP    H04-193528    7/1992
JP    H05-116148    5/1993
(Continued)

OTHER PUBLICATIONS

International Search Report for International Application No. PCT/JP2019/012336 dated Jun. 4, 2019, 2 pages, Japan.

*Primary Examiner* — James P Mackey
(74) *Attorney, Agent, or Firm* — Thorpe North & Western

(57) ABSTRACT

A method and device for manufacturing the tire are provided. For each tire obtained by feeding green tires having an identical specification into an identical vulcanizer, using an arrangement mechanism, with circumferential positions of the green tires varied with respect to the vulcanizer and vulcanizing the green tires, a storage unit stores characteristic value data of at least one of a UF or DB value and feed position data identifying the circumferential position of the green tires, a calculation unit calculates, based on the stored data, the circumferential position of the green tires with respect to the vulcanizer at which a characteristic value related to the characteristic value data is brought within a tolerance range, and feeding using the arrangement mechanism, into the vulcanizer, the green tire to be newly vulcanized while adjusting the green tire to the circumferential position with respect to the vulcanizer being calculated.

11 Claims, 14 Drawing Sheets

(58) Field of Classification Search
CPC .... B29D 2030/0635; B29D 2030/0665; B29D 30/0662; B29D 2030/0675
See application file for complete search history.

(56) References Cited

U.S. PATENT DOCUMENTS

| | | | | |
|---|---|---|---|---|
| 8,287,675 | B2* | 10/2012 | Mawby | B29D 30/0662 |
| | | | | 156/126 |
| 9,645,052 | B2* | 5/2017 | Mawby | B29D 30/0633 |
| 9,937,677 | B2* | 4/2018 | Mawby | G01M 17/02 |
| 10,279,636 | B2* | 5/2019 | Mawby | B60C 99/006 |
| 2007/0126153 | A1* | 6/2007 | Toyoda | B29D 30/0633 |
| | | | | 264/326 |

FOREIGN PATENT DOCUMENTS

| | | |
|---|---|---|
| JP | 2000-117853 | 4/2000 |
| JP | 2001-030257 | 2/2001 |
| JP | 2001-159584 | 6/2001 |
| JP | 2008-137286 | 6/2008 |

\* cited by examiner

METHOD AND DEVICE FOR MANUFACTURING TIRE

TECHNICAL FIELD

The present technology relates to a method and a device for manufacturing a tire, and particularly relates to a method and a device for manufacturing a tire which can manufacture, with high productivity, a tire that is enhanced in at least uniformity or dynamic balance.

BACKGROUND ART

Tire manufacturing information includes various information such as uniformity information and dynamic balance information. In a case where a variety of tire manufacturing information can be easily determined for each tire, the information can be used in, for example, analysis for enhancement of the uniformity or the dynamic balance of the tire and is thus very beneficial. For example, a method and a device for inspecting a tire have been proposed, the method and device measuring the rotation direction angle of a specific point (such as a balance light point or a primary peak point of an RFV (radial force variation)) with respect to a visible mark (such as a bar code) used as a reference point of the tire (see Japan Unexamined Patent Publication No. 2001-159584).

In the description in Japan Unexamined Patent Publication No. 2001-159584, how much the position in the tire rotation direction where the specific point is likely to appear is misaligned with the visible mark used as the reference is determined, and the determined information can be used to enhance the tire (see paragraph [0003]). However, Japan Unexamined Patent Publication No. 2001-159584 only focuses on measuring without much time and effort, the rotation direction angle of the specific point with respect to the visible mark used as a reference point (see paragraph [0005] and the like). Several methods for manufacturing a tire has been proposed in which the tire is manufactured by feeding a green tire into a vulcanizer with a tire circumferential position adjusted to a specific position, and vulcanizing the green tire (for example, see Japan Unexamined Patent Publication Nos. H05-116148 and 2001-030257). However, the known proposed methods involve cumbersome operations such as identification of the optimal tire circumferential position of the green tire with respect to the vulcanizer and adjustment of the tire circumferential position of the green tire, and there is room for enhancement in manufacturing, with high productivity, tires with enhanced uniformity and dynamic balance.

SUMMARY

The present technology provides a method and a device for manufacturing which can manufacture, with high productivity, a tire that is enhanced in at least one of the characteristics of uniformity and dynamic balance.

A method for manufacturing a tire includes manufacturing a tire by feeding, using an arrangement mechanism, each of a plurality of green tires having an identical specification into an identical vulcanizer, with tire circumferential positions of each of the plurality of green tires varied with respect to the vulcanizer, and by vulcanizing each of the plurality of green tires, storing, in a storage unit for each of the plurality of tires manufactured, characteristic value data of at least one of a uniformity value or a dynamic balance value and feed position data identifying the tire circumferential position of each of the plurality of green tires with respect to the vulcanizer during feeding into the vulcanizer, and calculating by using a calculation unit, based on the characteristic value data and the feed position data stored in the storage unit, the tire circumferential position of each of the plurality of green tires with respect to the vulcanizer at which a characteristic value related to the characteristic value data stored in the storage unit is brought within a tolerance range, and feeding, into the vulcanizer, each of the plurality of green tires to be newly vulcanized while adjusting, by using the arrangement mechanism, the tire circumferential position of each of the plurality of green tires with respect to the vulcanizer to the tire circumferential position calculated by the calculation unit.

A device for manufacturing a tire according to an embodiment of the present technology includes a vulcanizer that vulcanizes a green tire, an arrangement mechanism that feeds the green tire into vulcanizer, a control unit that controls movement of the arrangement mechanism, and a calculation unit and a storage unit. The device stores in the storage unit, for each of the plurality of tires manufactured by feeding, using the arrangement mechanism, each of a plurality of green tires having an identical specification into an identical vulcanizer, with tire circumferential positions of each of the plurality of green tires varied with respect to the vulcanizer, characteristic value data of at least one of a uniformity value or a dynamic balance value and feed position data identifying the tire circumferential position of each of the plurality of green tires with respect to the vulcanizer during feeding into the vulcanizer, calculating by the calculation unit, based on the characteristic value data and the feed position data stored in the storage unit, the tire circumferential position of each of the plurality of green tires with respect to the vulcanizer at which a characteristic value related to the characteristic value data stored in the storage unit is brought within a tolerance range, and in a case where each of the plurality of green tires is newly vulcanized, controlling the arrangement mechanism by the control unit, adjusting the tire circumferential position of each of the plurality of green tires with respect to the vulcanizer to the tire circumferential position calculated by the calculation unit, and feeding each of the plurality of green tires into the vulcanizer.

According to the present technology, in a case where a plurality of green tires of the identical specification is vulcanized using the identical vulcanizer, the arrangement mechanism is used to vary the tire circumferential positions of the green tires with respect to the vulcanizer. This allows determination of the degree of influence of the tire circumferential position on at least one of the characteristic values of the uniformity value or the dynamic balance value. Accordingly, the tire circumferential position of the green tire with respect to the vulcanizer at which the at least one characteristic value can be kept within the tolerance range can be calculated quickly and accurately by the calculation of the calculation unit. In a case where the green tire is newly vulcanized, the green tire is fed with the tire circumferential position of the green tire adjusted to the tire circumferential position calculated by the calculation unit, thus allowing manufacturing, with high productivity, of a tire with at least one of the characteristics of uniformity and dynamic balance enhanced.

DETAILED DESCRIPTION

A method and a device for manufacturing a tire according to embodiments of the present technology will be described below with reference to the drawings.

Figure 1:
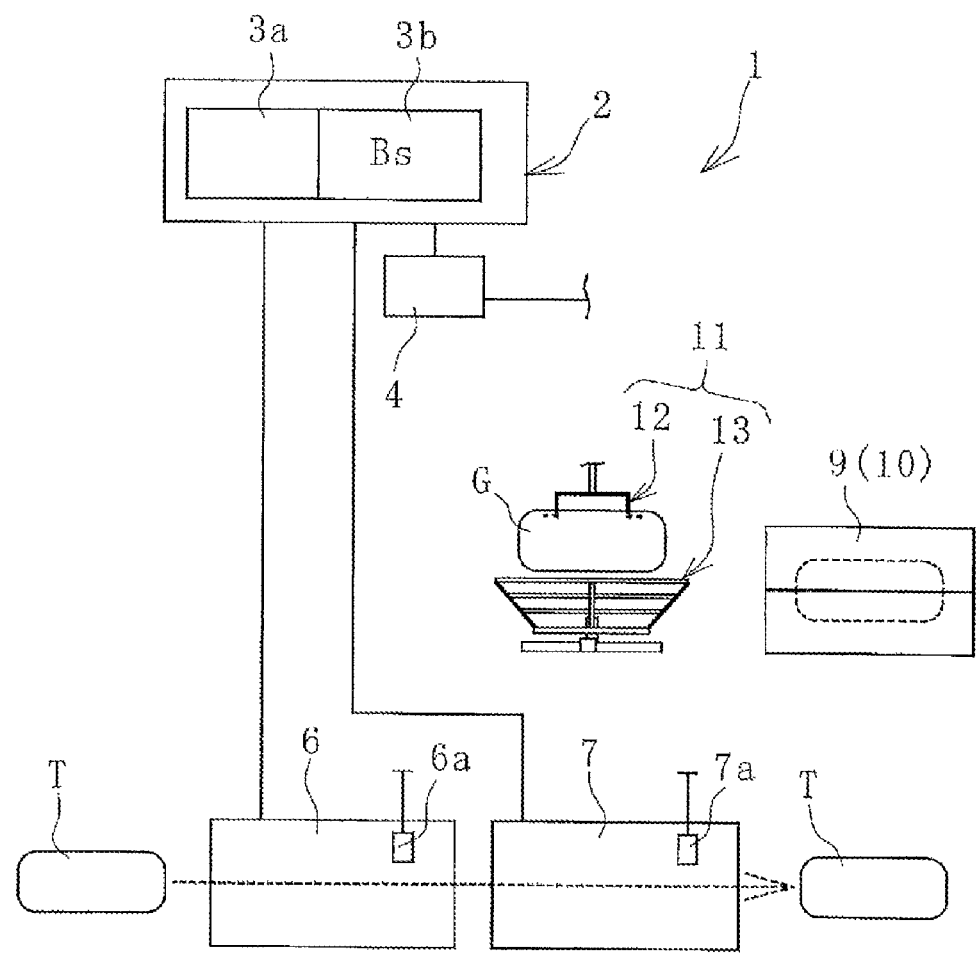
FIG. 1 is an explanatory diagram illustrating a device for manufacturing a tire according to the present technology.

In an embodiment of the present technology illustrated in FIG. 1, tires T having the identical specifications are manufactured by vulcanizing a plurality of green tires G having the identical specifications using the identical vulcanizer 9. According to the present technology, the tires T are each manufactured with at least one of characteristics of uniformity (hereinafter referred to as UF) or dynamic balance (hereinafter referred to as DB) enhanced and with the characteristic value (UF value or DB value) set within a preset tolerance range. In a case described in this embodiment, for example, the tire T is manufactured with both of the characteristics UF and DB enhanced in an optimal combination and with the UF value and the DB value set within tolerance ranges (with the UF value and the DB value minimized within the tolerance ranges).

A tire manufacturing device 1 of the present technology used in this embodiment includes a vulcanizer 9, an arrangement mechanism 11 that feeds a green tire G into the vulcanizer 9, a control unit 4 that controls movement of the arrangement mechanism 11, and a computer server 2 (hereinafter referred to as a server 2) connected to the control unit 4. The server 2 includes a calculation unit 3a and a storage unit 3b. As the calculation unit 3a and the storage unit 3b, a CPU (central processing unit) and a memory constituting a computer can respectively be illustrated. A database Bs described below is stored in the storage unit 3b.

In this embodiment, a UF measurement instrument 6 and a DB measurement instrument 7 are each connected to the server 2 and can input detection data to the server 2. The UF measurement instrument 6 includes a mark applying unit 6a applying a UF mark M1 to a side surface of the tire T manufactured. The DB measurement instrument 7 includes a mark applying unit 7a applying a light point mark M2 to a side surface of the tire T manufactured. The UF mark M1 indicates the tire circumferential position where the primary component of RFV waveform data has the maximum value in the tire T, and the light point mark M2 indicates the tire circumferential position where the tire T has the lowest weight.

Figure 2:
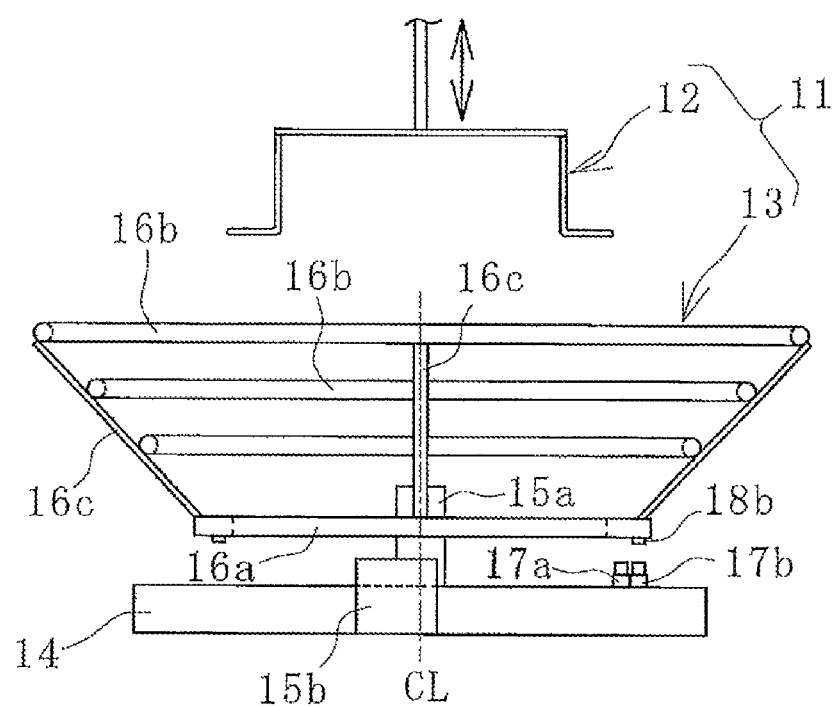
FIG. 2 is an explanatory diagram illustrating an arrangement mechanism in FIG. 1 in a side view.
Figure 3:
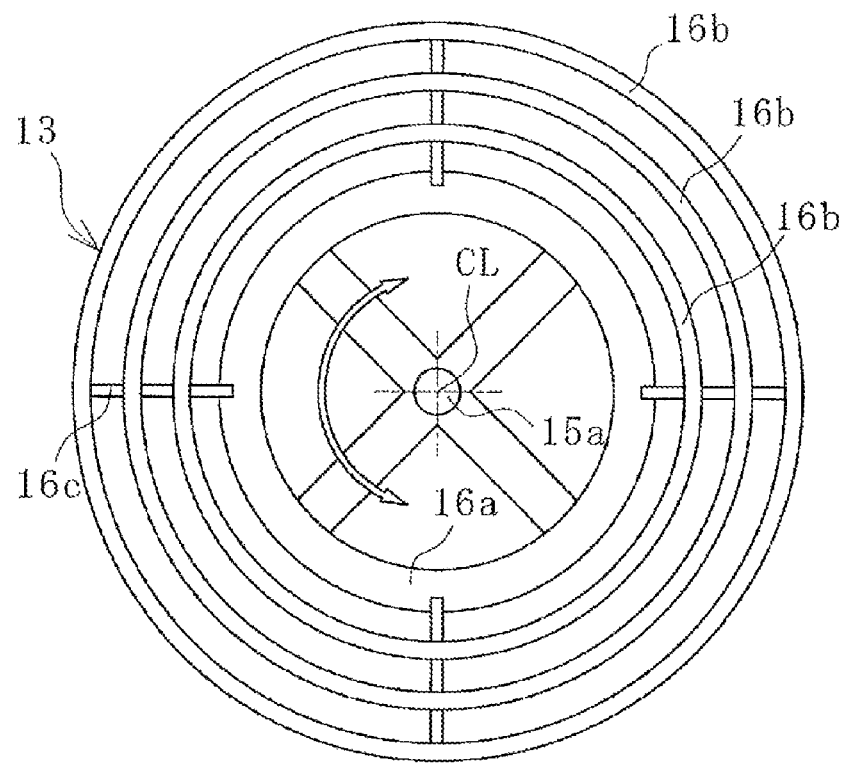
FIG. 3 is an explanatory diagram illustrating a cradle in FIG. 2 in a plan view.
Figure 4:
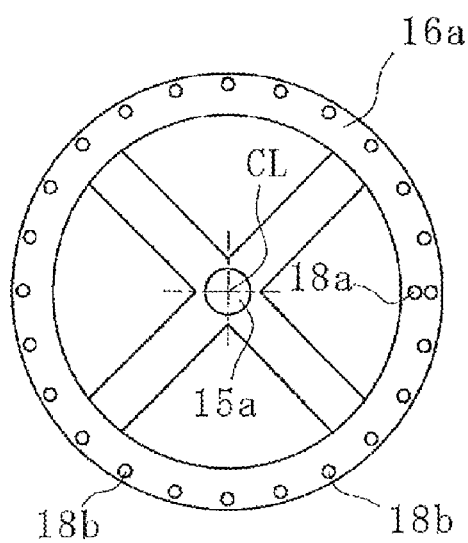
FIG. 4 is an explanatory diagram illustrating a bottom frame in FIG. 3 in a bottom view.

The arrangement mechanism 11 illustrated in FIGS. 2 to 4 includes a cradle 13 on which the green tire G is placed sideways, and a transport machine 12 holding the green tire G sideways. The transport machine 12 can be moved to any desired position, and for example, a loader or the like suspending and conveying the green tire G is used as the transport machine 12.

The cradle 13 includes a rotating shaft 15a erected on a base 14, a drive motor 15b rotating the rotating shaft 15a, and a bottom frame 16a supported on the rotating shaft 15a and frame materials 16b and 16c. The bottom frame 16a, shaped like an annular plate, is coupled to the rotating shaft 15a by a support frame extending radially around the rotating shaft 15a. A plurality of annular frames 16b are disposed above the bottom frame 16a and spaced apart from one another vertically, and each of the frame materials 16b is coupled to the bottom frame 16a by a frame material 16c extending vertically. The annular frame materials 16b located upper position have larger diameter, and a meshed bowl is formed by the bottom frame 16a and each of the frame materials 16b and 16c. The cradle 13 is not required to have such a bowl shape, and it is sufficient that the cradle 13 may be specified such that the green tire G can be placed sideways on the cradle 13. In a case where an upper portion of the bowl shape has a larger diameter as in this embodiment, the various green tires G having different outer diameter sizes are easily placed sideways on the cradle 13, thus improving versatility.

One origin point detection sensor 17a and one angle detection sensor 17b are disposed on a top surface of the base 14. As illustrated in FIG. 4, on a bottom surface of the bottom frame 16a, one origin point marker 18a is disposed, and a large number of angle markers 18b are disposed at regular intervals in the circumferential direction. The origin point detection sensor 17a and the origin point marker 18a are disposed at the identical radial position around the rotating axis 15a. The angle sensing sensor 17b and each of the angle markers 18b are disposed at the identical radial position around the rotating axis 15a. It is sufficient that the origin point detection sensor 17a can detect the presence or absence of the origin point marker 18a, and the angle detection sensor 17b can detect the presence or absence of the angle marker 18b, and thus an optical sensor or the like, for example, can be used as the origin point detection sensor 17a and the angle detection sensor 17b.

Detection signals from the origin point detection sensor 17a and the angle detection sensor 17b are input to the control unit 4. Based on the input detection signals, the control unit 4 controls the movement (rotation and rotation stop) of the drive motor 15b and rotates the rotating shaft 15a through a desired angle. Note that the center of the rotating shaft 15a is substantially identical as the tire axial center CL of the green tire G placed sideways on the cradle 13. The rotation mechanism of the cradle 13 is not limited to this embodiment, and it is sufficient that the rotation mechanism can rotate the green tire G placed sideways on the cradle 13 to a desired angular position around the tire axial center CL.

Figure 5:
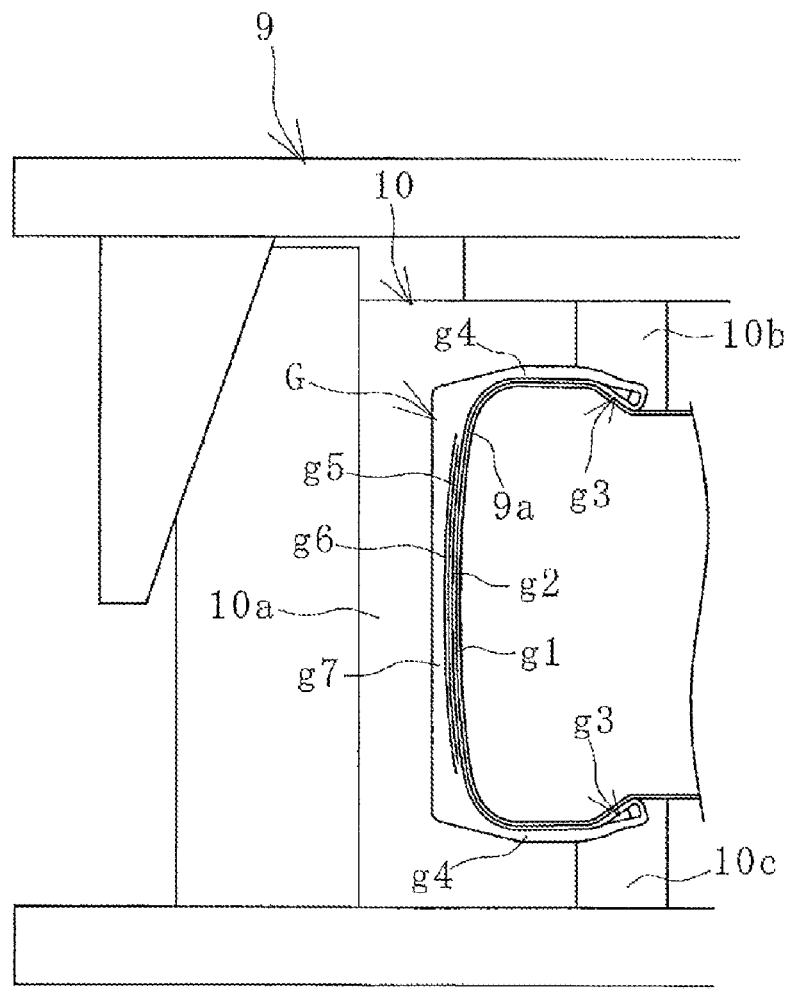
FIG. 5 is an explanatory diagram illustrating a part of a vulcanizer in a cross-sectional view.

As illustrated in FIG. 5, a vulcanization mold 10 is attached to the vulcanizer 9. In this embodiment, the vulcanization mold 10 is what is called a sectional type mold including a large number of annularly disposed sector molds 10a, an annular upper side mold 10b, and an annular lower side mold 10c. The position at which the vulcanization mold 10 is attached to the vulcanizer 9 is predetermined. The vulcanization mold 10 is not limited to the sectional type illustrated in this embodiment, and what is called a single split mold may be used as the vulcanization mold 10.

Now, a method for manufacturing the tires T using this manufacturing device 1 will be described. In a case where the tires T having the identical specifications are manufactured using the identical vulcanizer 9 (vulcanization mold 10), the tires T are manufactured by vulcanizing the plurality of green tires G having the identical specifications using the vulcanizer 9 (vulcanization mold 10). In a case where the tires T are pre-manufactured, the green tires G are located at a plurality of different tire circumferential positions (arrangement in the tire circumferential direction) with respect to the vulcanizer 9 (vulcanization mold 10) and vulcanized.

Preferably, the plurality of different tire circumferential positions at which the green tires G are disposed are at regular intervals in tire circumferential direction and the number of the tire circumferential positions is three or more, for example, is about three to eight. In a case where the green tires G are fed into the vulcanizer 9 each at four different positions with regular intervals in the tire circumferential direction with respect to the vulcanizer 9, each green tire G is disposed rotating by 90° around the tire axial center CL and then fed and installed in the vulcanizer 10.

Figure 6:
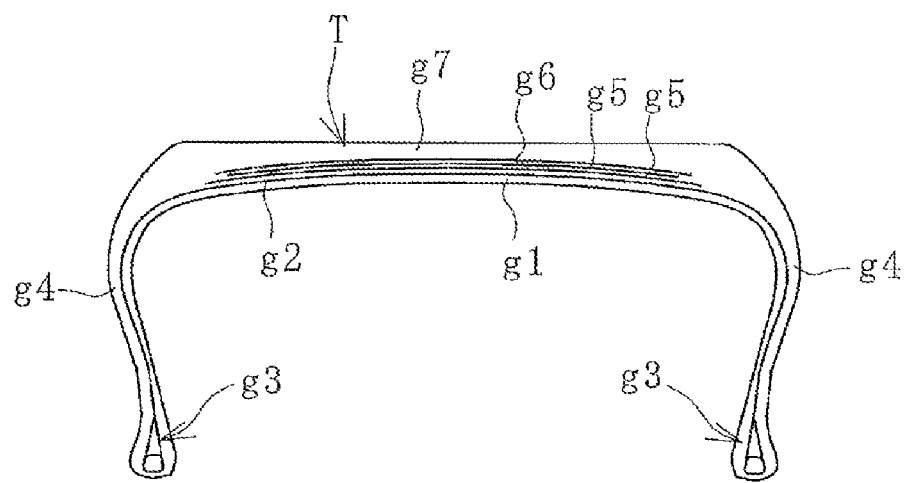
FIG. 6 is an explanatory diagram illustrating an upper half of a tire in FIG. 6 in a cross-sectional view.

As illustrated in FIG. 6, the tire T (pneumatic tire T) to be manufactured includes various tire components g (g1 to g7) layered. Specifically, a carcass g2 is layered on an outer circumferential surface of an innermost innerliner g1. The carcass g2 is installed between a pair of left and right beads g3. Both end portions of the carcass g2 are folded back around the bead cores of the corresponding beads g3 from inside to outside of the tire. A belt g5 is embedded in the center portion in the tire lateral direction of the carcass g2, and a belt cover g6 and a tread rubber g7 are layered on the outer circumferential surface of the belt g5. Side rubber g4 is layered on the outer circumferential surface of the carcass g2 on both sides in the tire lateral direction of the tread rubber g7. The tire components g of the green tire G are mainly unvulcanized rubber and reinforcing members, and the tire T is formed by using required tire components g as appropriate. Instead of being specified to cover the entire width of the belt g5, the belt cover g6 may be a specified to cover a part of the belt g5 in the lateral direction. Alternatively, the belt cover g6 may not be provided.

Figure 7:
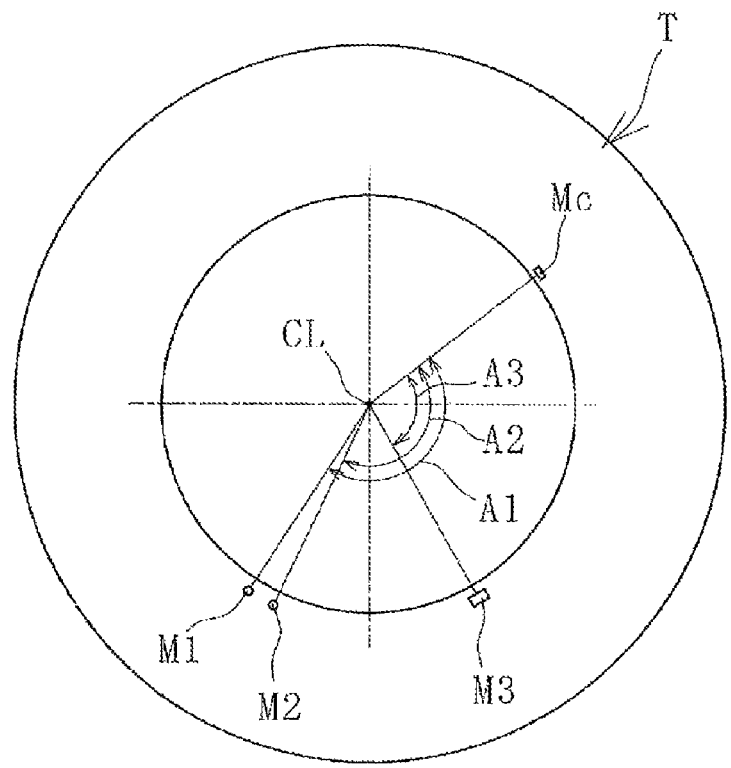
FIG. 7 is an explanatory diagram illustrating the tire in FIG. 6 in a side view.

As illustrated in FIG. 7, a UF mark M1 is applied to a side surface of the tire T at the position of a clockwise angle A1 about the tire axial center CL with respect to a QR® (quick response code) label Mc. A light point mark M2 and a factory code mark M3 are respectively applied at the positions of angles A2 and A3. This QR® label Mc is a known label (which enables access to various manufacturing information) including various manufacturing information of the tire T, and is applied to the side surface of the green tire G being formed. The factory code mark M3 indicates a factory in which the tire T is manufactured, and is engraved during vulcanization.

Figure 8:
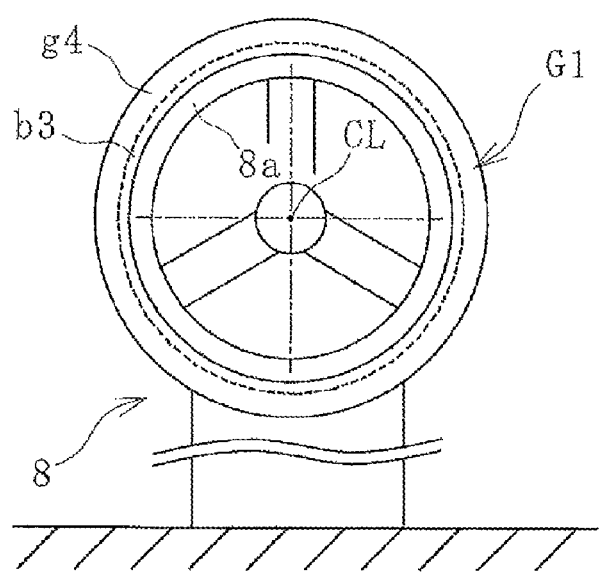
FIG. 8 is an explanatory diagram illustrating a molding step for a primary green tire in a side view of the tire.
Figure 9:
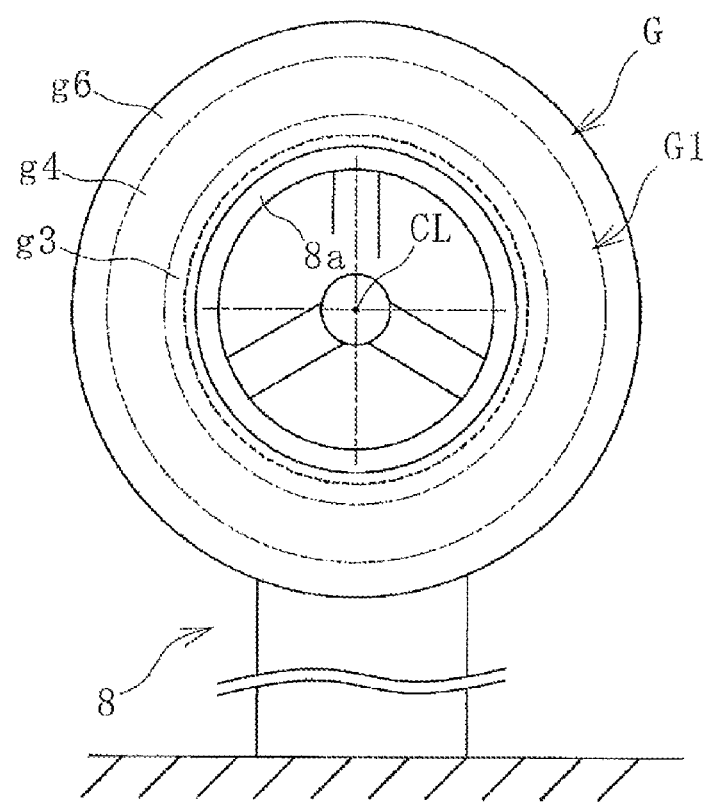
FIG. 9 is an explanatory diagram illustrating, in a tire side view, a step of molding a green tire using the primary green tire in FIG. 8.

In the molding step, as illustrated in FIGS. 8 and 9, each of the green tires G (G1) is formed by bonding the tire components g on a forming drum 8a of the identical molding machine 8. Specifically, in FIG. 8, the primary green tire G1 is formed by bonding the innerliner g1, the carcass g2, the bead g3, the side rubber g4, and the like together on the molding drum 8a. In FIG. 9, the green tire G is formed such that the pair of left and right beads g3 are brought into close proximity on the molding drum 8a, and the belt g5, belt cover g6, tread rubber g7, and the like are bonded to the outer circumferential surface of the primary green tire G1 in which the innerliner g1, the carcass g2, and the side rubber g4 are expanded toward the outer circumferential side.

The band-like tire components g are spliced at one or a plurality of tire circumferential positions and formed into a cylindrical shape (annular shape). Note that the primary green tire G1 and the green tire G may be formed using the identical one molding machine 8, or the primary green tire G1 and the green tire G may be formed using separate dedicated molding machines 8.

Figure 10:
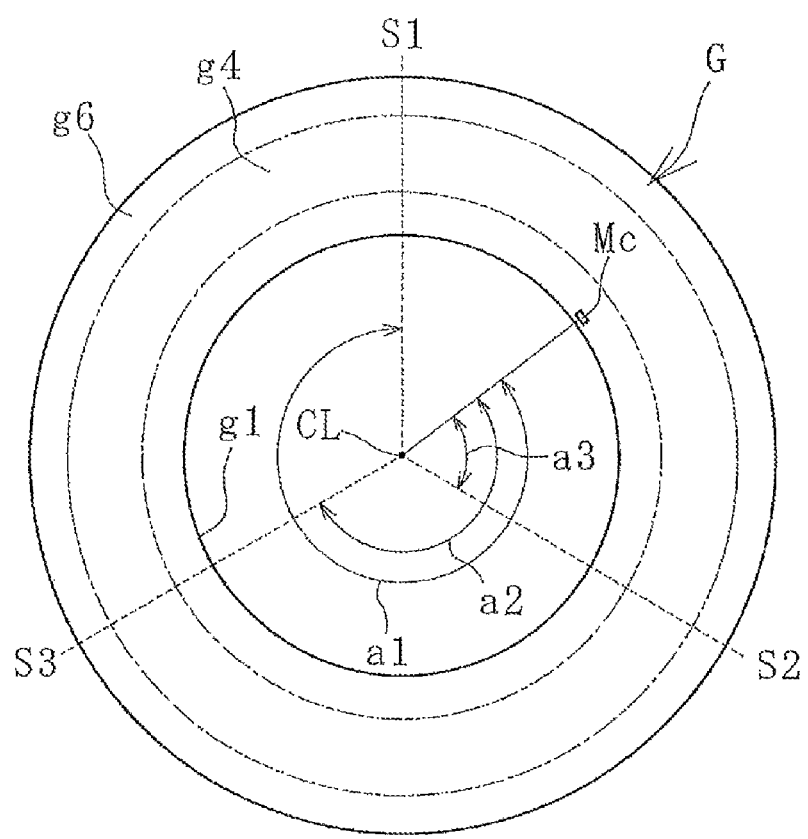
FIG. 10 is an explanatory diagram illustrating a splice position for tire components in a side view of the tire.

In FIG. 10, the splice positions of the innerliners g1, the side rubbers g4, and the tread rubber g7 of the tire components g are illustrated as S1, S2, and S3, respectively. In other words, a splice position S1 of the innerliner g1 corresponds to the position of the clockwise angle a1 about the tire axial center CL with respect to the QR® label Mc, and a splice position S2 of the side rubber g4 and a splice position S3 of the tread rubber g7 respectively correspond to the positions of the angles a3 and a2.

For each of the green tires G having the identical specifications, the splice positions of the main tire components are at the identical arrangement in the tire circumferential direction. Specifically, each of the green tires G is formed such that the splice positions of the tire components g correspond to preset predetermined positions (predetermined angles) with respect to a preset visible mark M (the QR® label Mc in this embodiment).

Figure 11:
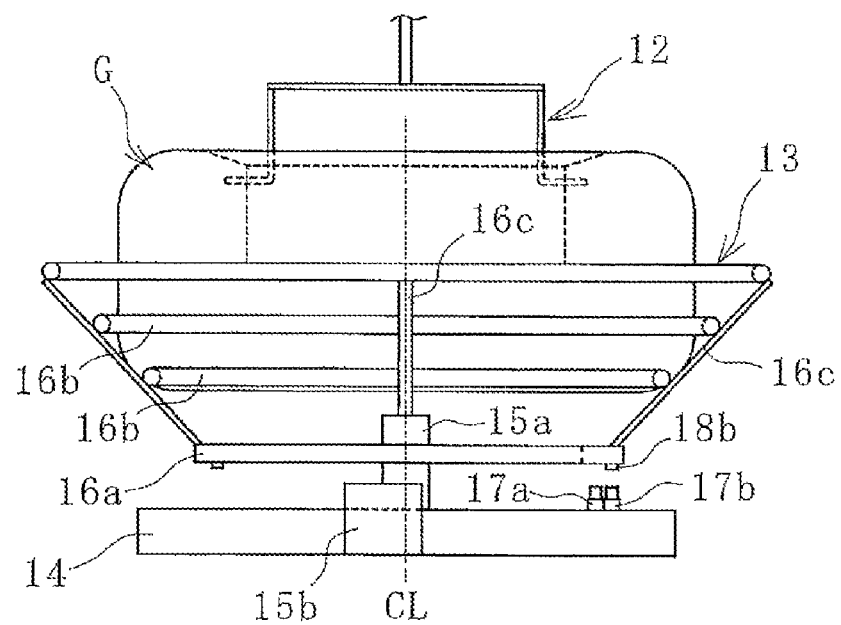
FIG. 11 is an explanatory diagram illustrating, in a side view, the green tire placed on the cradle.
Figure 12:
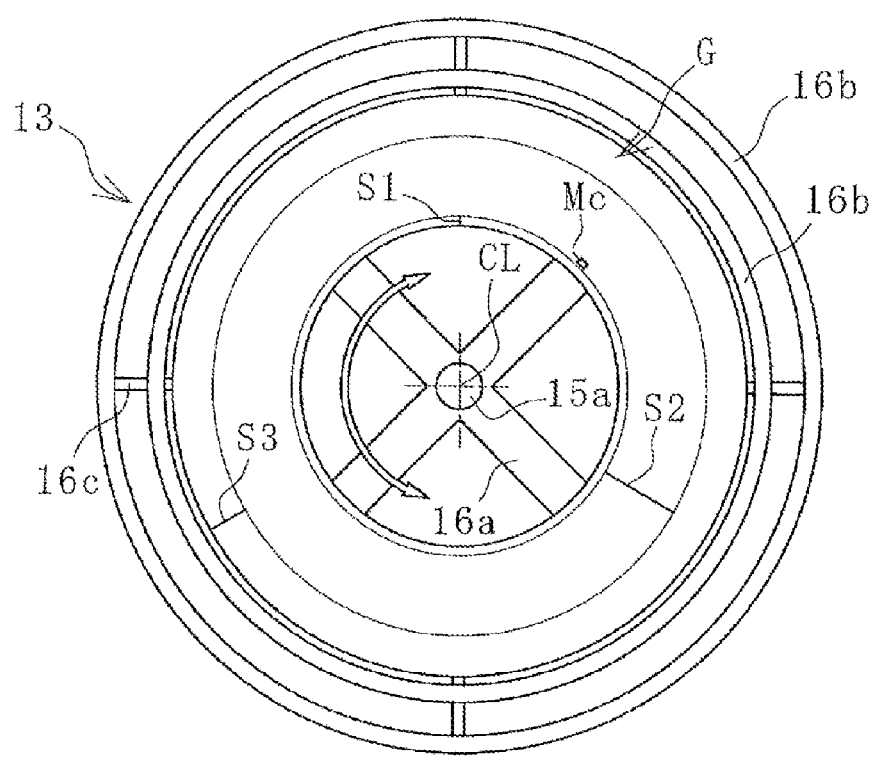
FIG. 12 is an explanatory diagram illustrating, in a plan view, the green tire placed on the cradle.

The green tire G formed is fed into the vulcanizer 9 through the arrangement mechanism 11. In this embodiment, as illustrated in FIG. 11, each of the green tires G is transported from the molding machine 8 side to the cradle 13 by the transport machine 12. As illustrated in FIG. 12, the transported green tire G is placed sideways on the cradle 13 always with the constant tire circumferential position of the splice position (S1 or the like) in the tire circumferential position of the predetermined tire component g with respect to the cradle 13. For example, the green tire G is placed on the cradle 13 with the tire circumferential position of the splice position S1 (or the QR® label Mc) of the innerliner g1 constantly aligned with the reference point set on the cradle 13.

In a case where the green tires G are fed into the vulcanizer 9 at four different positions with regular intervals in the tire circumferential direction with respect to the vulcanizer 9, the rotating shaft 15a is rotated by 90° to adjust the tire circumferential position (arrangement) of each of the green tires G. In this embodiment, the origin point is adjusted by rotating the rotating axis 15a until the origin point marker 18a is placed in a position detected by the origin point detection sensor 17a. In this state, the first green tire G placed on the cradle 13 is conveyed to and fed into the vulcanizer 9 by the transport machine 12 with the tire circumferential position of the green tire G unchanged and maintained.

Figure 13:
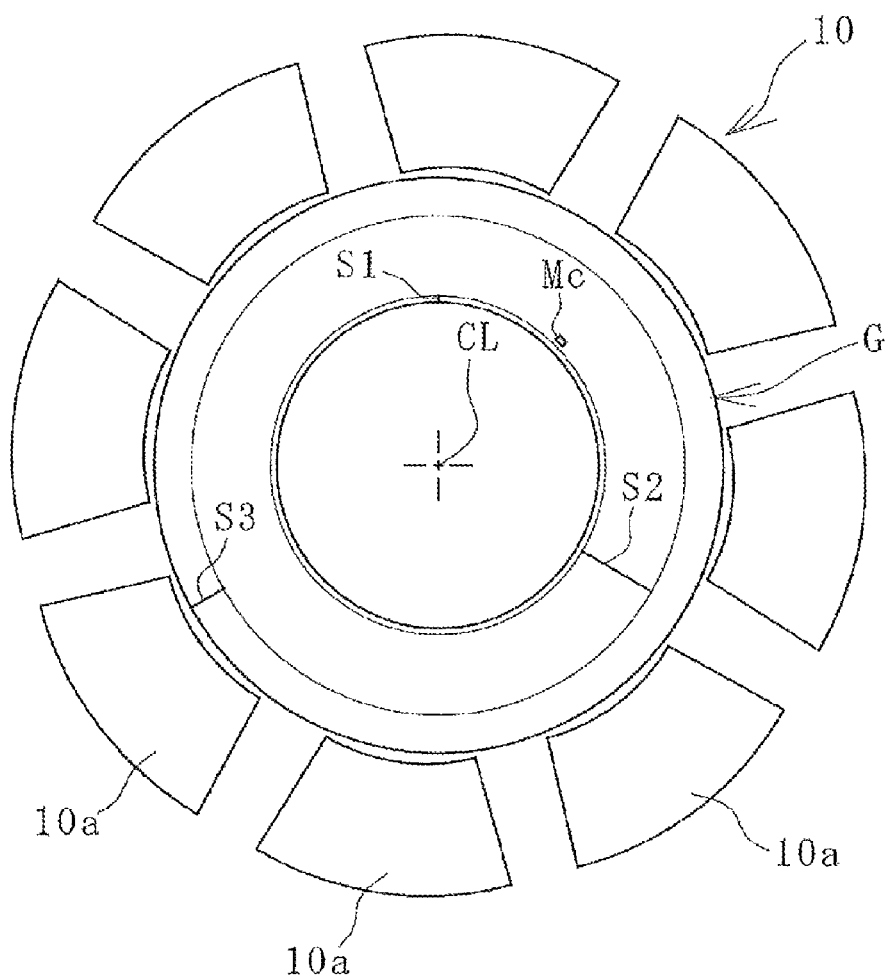
FIG. 13 is an explanatory diagram illustrating, in a plan view, the green tire fed into a vulcanization mold, which is open.
Figure 14:
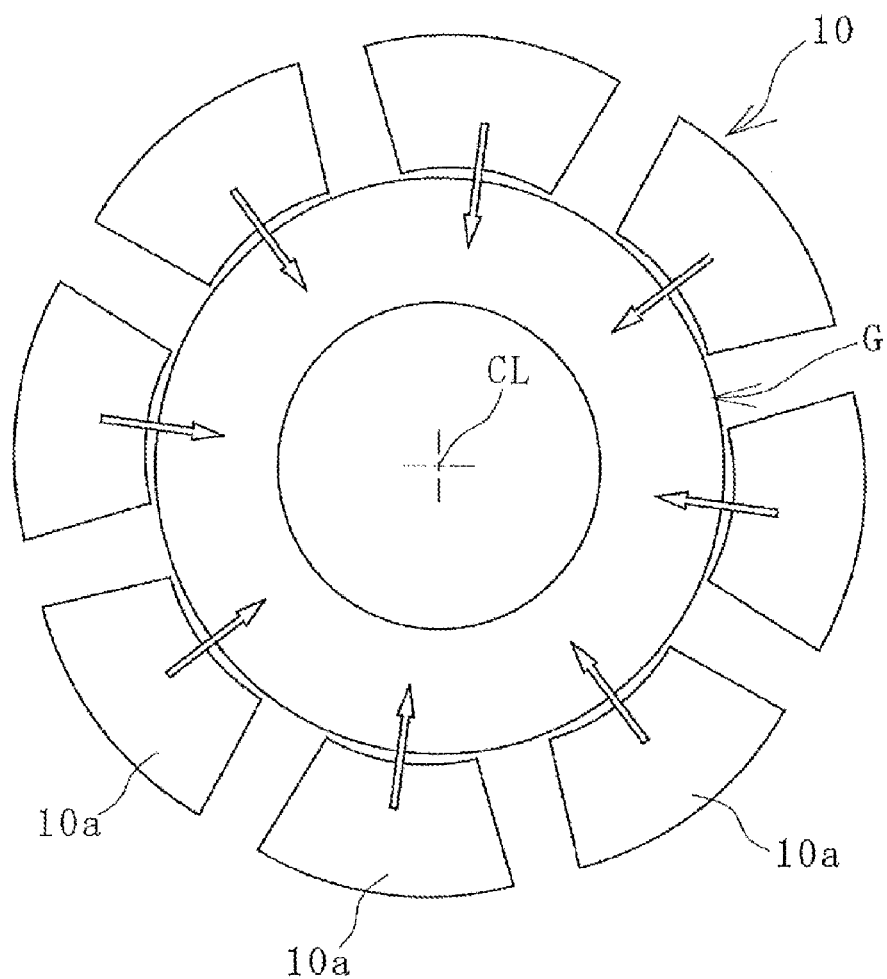
FIG. 14 is an explanatory diagram illustrating a step of closing the vulcanization mold in FIG. 13 in a plan view.
Figure 15:
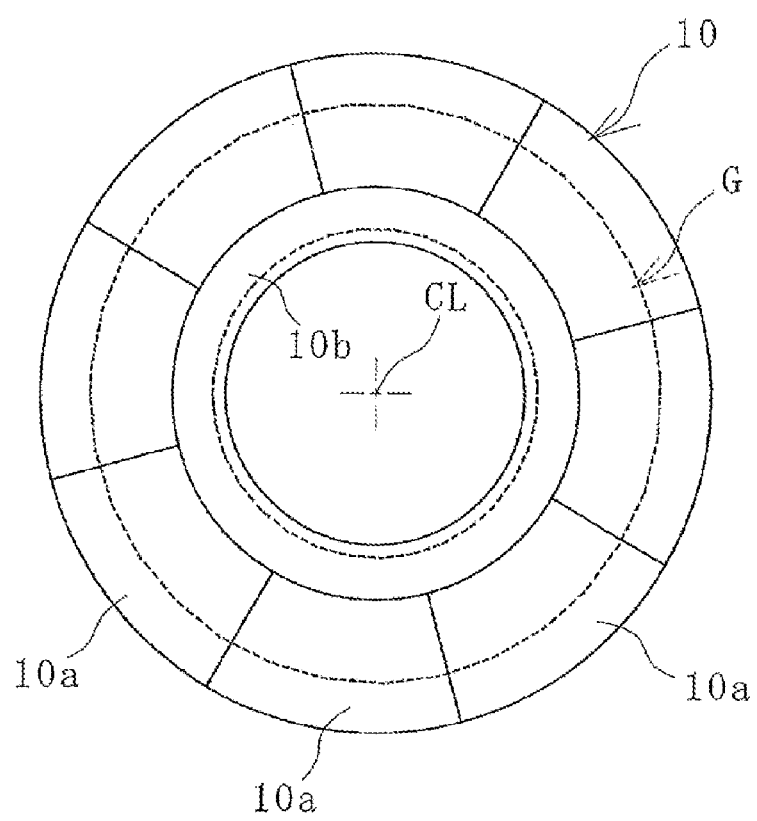
FIG. 15 is an explanatory diagram illustrating, in a plan view, the vulcanization mold in FIG. 14, which is closed.

As illustrated in FIG. 13, in the vulcanizer 9, the fed green tire G is installed in the vulcanization mold 10, which is open. Then, as illustrated in FIG. 14, each sector mold 10a is moved closer to the tire axial center CL to close the vulcanization mold 10 as illustrated in FIG. 15. The tire T is manufactured by vulcanizing the green tire G for a predetermined amount of time in the vulcanization mold 10, which is closed.

Like the preceding green tire G, the next green tire G to be vulcanized is placed on the cradle 13. Then, the rotating axis 15*a*, for which the origin point has been adjusted, is rotated until the angle detection sensor 17*b* detects the angle marker 18*b* located at the position corresponding to 90° from the origin point marker 18*a*. Accordingly, the tire circumferential position of the green tire G is displaced by 90° with respect to the tire circumferential position of the preceding green tire G. Then, with the tire circumferential position of the green tire G unchanged and maintained, the green tire G is conveyed to and fed into the vulcanizer 9 by the transport machine 12 Subsequently, the next tire T is manufactured by being vulcanized as is the case with the preceding green tire G. Also for each of the subsequent green tires G, the rotating shaft 15*a* is rotated by 90° to change the tire circumferential arrangement of the green tire G, and the green tire G is fed into the vulcanizer 9 with the tire circumferential position of the green tire G unchanged and maintained, and is then vulcanized. The tires T are thus sequentially manufactured.

Then, for each pre-manufactured tire T, the UF value data and the DB value data are acquired and stored in the storage unit 3*b*. The UF value and the DB value mean the respective maximum values. Additionally, the feed position data, identifying the tire circumferential position (arrangement in the tire circumferential direction) of green tire G of each pre-manufactured tire T with respect to the vulcanizer 9 during feeding into the vulcanizer 9, is acquired and stored in the storage unit 3*b*.

To obtain the UF value data, the tire T is set in the UF measurement instrument 6 and measured to acquire UF waveform data. Waveform data such as RFV and LFV (lateral force variation) (raw waveform data, primary component waveform data, multiple component waveform data, and the like) is acquired as the UF waveform data. The acquired UF waveform data is input to the server 2 and stored in the storage unit 3*b*. Based on the acquired UF waveform data, the UF mark M1 is applied by the mark applying unit 6*a* at a position identified by the calculation unit 3*a* as a tire circumferential position where a primary component of the RFV waveform data has the maximum value. Additionally, the UF value, which corresponds to the amplitude (maximum value) of the RFV waveform data, is calculated by the calculation unit 3*a*.

To obtain DB value data, the tire T is set in the DB measurement instrument 7 and measured to acquire DB vector data. The acquired DB vector data is input to the server 2 and stored in the storage unit 3*b*. The mark applying unit 7*a* applies the light point mark M2 at the position identified by the calculation unit 3*a* based on the acquired DB vector data, as the tire circumferential position at which the tire T has the lowest weight. Additionally, the calculation unit 3*a* calculates the DB value (the value corresponding to the maximum vector length of the DB vector data) at the tire circumferential position at which the light point mark M2 is applied. Note that the order in which the UF waveform data and the DB vector data are acquired is optional; whichever of the UF waveform data and the DB vector data may be acquired earlier.

Then, based on the characteristic value data and the feed position data stored in the storage unit 3*b*, the calculation unit 3*a* calculates the tire circumferential position of the green tire G with respect to the vulcanizer 9 at which the characteristic value (i.e., the UF value and the DB value) related to the characteristic value data stored in the storage unit 3*b* is brought within a tolerance range. Here, bringing the characteristic value within the tolerance range is a reduction in the characteristic value, and it is ideal for the characteristic value to be set to a minimum value even within a set permissible range.

A smaller UF value indicates superior UF, and thus, under the condition in which the UF value is within the tolerance range, the calculated UF values of the tires T are compared with one another. Then, the calculation unit 3*a* calculates and identifies the tire circumferential position of the green tire G with respect to the vulcanizer 9 in a case where the tire T with the minimum UF value is manufactured.

A smaller DB value indicates superior DB, and thus, under the condition in which the DB value is within the tolerance range, the calculated DB values of the tires T are compared with one another. Then, the calculation unit 3*a* calculates and identifies the tire circumferential position of the green tire G with respect to the vulcanizer 9 in a case where the tire T with the minimum DB value is manufactured.

In a case where the identified tire circumferential position (the arrangement in the tire circumferential direction) of the green tire G with respect to the vulcanizer 9 is the identical for the UF value and for the DB value, the calculation unit 3*a* determines the identified tire circumferential position to be the optimal tire circumferential position. On the other hand, the above-described identified tire circumferential position may differ between the UF value and the DB value. Assuming such a case, for example, priorities for enhancement are preset for the UF and the DB. Then, the above-described identified tire circumferential position for the characteristic with the higher priority can be determined to be the optimal tire circumferential position. For example, in a case where the enhancement in UF over a DB is prioritized, under the condition in which the UF value and the DB value are within the tolerance range, the tire circumferential position of the green tire G with respect to the vulcanizer 9 when the tire T having the minimum UF value is manufactured is determined as the optimal tire circumferential position by the calculation unit 3*a*.

Alternatively, in a case where the above-described identified tire circumferential position differs between the UF value and the DB value, the step of pre-manufacturing the tire T can be performed again. In this case, the tire circumferential position of the green tire G that is fed to the vulcanizer 9 is different from before.

The present technology can also focus exclusively on UF and manufacture the tire T with UF enhanced. In this case, the calculation unit 3*a* determines the tire circumferential position of the green tire G with respect to the vulcanizer 9 in a case where the tire T with the minimum UF value is manufactured to be the optimal tire circumferential position under the condition in which the UF value is within the tolerance range.

The present technology can also focus exclusively on DB and manufacture the tire T with DB enhanced. In this case, the calculation unit 3*a* determines the tire circumferential position of the green tire G with respect to the vulcanizer 9 in a case where the tire T with the minimum DB value is manufactured to be the optimal tire circumferential position under the condition in which the DB value is within the tolerance range.

After the tire T is pre-manufactured and data is acquired as described above, the vulcanizer 9 is used to manufacture the tire T having the identical specifications as those of the pre-manufactured tire T. Specifically, a new green tire G having the identical specifications as those of the pre-vulcanized green tire G is vulcanized using this vulcanizer 9, and at this time, the following operations are performed.

The new green tire G to be vulcanized is formed similarly to the pre-vulcanized green tire G, and as illustrated in FIG. 11 and FIG. 12, the new green tire G to be vulcanized is placed sideways on the cradle 13. Then, the new green tire G to be vulcanized is fed into the vulcanizer 9 with the tire circumferential position of the green tire G with respect to the vulcanizer 9 adjusted to the above-described optimal tire circumferential position using the arrangement mechanism 11.

Specifically, after the new green tire G is placed on the cradle 13, the rotating shaft 15a is rotated to adjust the tire circumferential position of the new green tire G with respect to the vulcanizer 9 to the optimal tire circumferential position. Then, the green tire G is conveyed to and fed into the vulcanizer 9 by the transport machine 12 with the tire circumferential position of the green tire G unchanged and maintained. Subsequently, the tire T is manufactured by using the vulcanizer to vulcanize the green tire G as is the case with the pre-vulcanized green tire G.

According to this embodiment, in a case where the tire T is pre-manufactured, the green tire G can be fed into the vulcanizer 9 with the tire circumferential direction of the green tire G with respect to the vulcanizer 9 varied using the arrangement mechanism 11. This allows labor of operations to be lightened. Additionally, based on the characteristic value data of at least one of the UF value or the DB value of the pre-manufactured tire T and the feed position data regarding the green tire G, the degree of influence, on the at least one characteristic value, of the tire circumferential position of the green tire G in the vulcanizer 9 can be determined. The database Bs stores the characteristic value data of at least one of the UF value or the DB value, the feed position data of the green tire G, the tire circumferential position data of the splice position of the tire component g in the green tire G, and the like for large number of tires T having the identical specifications are stored in the database Bs. Thus, calculation of the calculation unit 3a allows quick and accurate computation of the tire circumferential position (optimal tire circumferential position) of the green tire G with respect to the vulcanizer 9 at which the at least one characteristic value can be maintained within the tolerance range.

Subsequently, in a case where the green tire G is newly vulcanized, the tire circumferential position of the green tire G with respect to the vulcanizer 9 can be accurately adjusted to the optimal tire circumferential position using the arrangement mechanism 11. Then, by feeding the green tire into the vulcanizer 9 with the tire circumferential position adjusted to the optimal tire circumferential position, the tire T with at least one of the characteristics of UF and DB enhanced can be manufactured with high productivity.

In this embodiment, the operations of varying and adjusting the circumferential position of the green tire G with respect to the vulcanizer 9 are performed using the cradle 13. However, the present technology is not limited to this embodiment. For example, the transport machine 12 holding the green tire G sideways is configured to be rotatable around the tire axial center CL of the held green tire G. Then, by rotating the transport machine 12 holding the green tire G, around the tire axial center CL of the green tire G held by the transport machine 12, an operation can be performed that varies the tire circumferential position of the green tire G to be pre-vulcanized with respect to the vulcanizer 9. Additionally, an operation can be performed in which the green tire G to be newly vulcanized is adjusted to the optimal tire circumferential position calculated by the calculation unit 3a.

Figure 16:
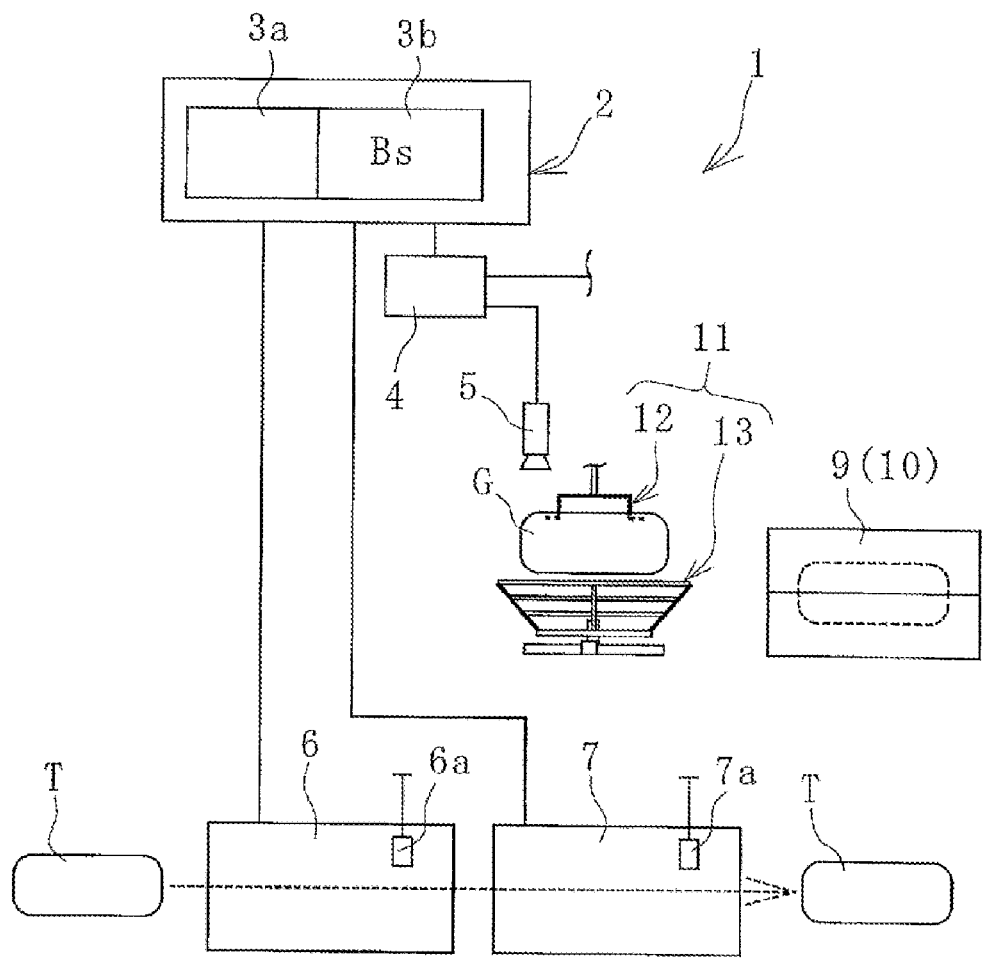
FIG. 16 is an explanatory diagram illustrating another manufacturing device used in the method for manufacturing a tire according to an embodiment of the present technology.

In the manufacturing device 1 illustrated in FIG. 16, a detector 5 using a side surface of the green tire G as a detection target is connected to the server 2 and can input the detection data to the server 2 through the control unit 4. The manufacturing device 1 illustrated in FIG. 16 differs from the manufacturing device 1 illustrated in FIG. 1 only in the detector 5, with the other components of the manufacturing device 1 illustrated in FIG. 16 similar to the corresponding components of the manufacturing device 1 illustrated in FIG. 1.

The detector 5 acquires the position of the visible mark (Mc, S1, S2, S3, or the like) on the side surface of the green tire G. In this embodiment, a digital camera (image acquisition machine) that acquires a side view image of the green tire G is used as the detector 5. Operation of the image acquisition machine 5 is controlled by the control unit 4.

The method for manufacturing a tire using the manufacturing device 1 differs from the method for manufacturing a tire using the manufacturing device 1 illustrated in FIG. 1 in the operation of varying the tire circumferential position of the green tire G to be pre-vulcanized with respect to the vulcanizer 9 and the operation of adjusting the new green tire G to be subsequently vulcanized to the optimal tire circumferential position calculated by the calculation unit 3a, with the other operations and procedures similar to the corresponding operations and procedures of the method for manufacturing a tire using the manufacturing device 1 illustrated in FIG. 1. Thus, the operations differs from the method for manufacturing a tire using the manufacturing device 1 illustrated in FIG. 1 will be described.

In the manufacturing device 1 illustrated in FIG. 16, the green tire G to be pre-vulcanized and the new green tire G to be subsequently vulcanized is transported to the cradle 13 by the transport machine 12, and randomly placed sideways on the cradle 13. Specifically, the transported green tires G are not placed sideways with the tire circumferential position of the splice position (S1 or the like) of the predetermined tire component g kept in the constant circumferential position with respect to the cradle 13.

Thus, in a case where the manufacturing device 1 is used, the visible mark (such as the QR® label Mc or the splice position of the tire component g) is preset on the tire side surface as a reference of the tire circumferential position. Then, the visible mark is detected in a state where the green tire G is disposed on the arrangement mechanism 11, and based on the detected visible mark, the operation of varying the tire circumferential position of the green tire G with respect to the vulcanizer 9 and the operation of adjusting the tire circumferential position of the green tire G to the tire circumferential direction calculated by the calculation unit 3a (optimal tire circumferential position) are performed.

Specifically, the image acquisition machine 5 uses the QR® label Mc as a visible mark to acquire a side view image of the green tire G placed sideways on the cradle 13. Based on the acquired side view image, the visible mark Mc is detected as, for example, a difference in color shade or chroma from peripheries, and the position of the visible mark Mc is calculated and identified by the calculation unit 3a. The identified position of the visible mark Mc allows identification of the tire circumferential position (arrangement) of the green tire G placed on the cradle 13. The tire circumferential relative positions of the visible mark Mc and the splice position of the predetermined tire component g of the green tire G are determined in advance, and the tire circumferential relative position data is stored in the storage unit 3b.

On the cradle 13, the rotating shaft 15a is rotated using the identified visible mark Mc as a reference to perform the operation of varying the tire circumferential position, with respect to the vulcanizer 9, of the green tire G placed on the cradle 13, and the operation of adjusting the tire circumferential position of the green tire G to the tire circumferential position calculated by the calculation unit 3a (optimal tire circumferential position). Accordingly, the splice position of the predetermined tire component g of the green tire G can be disposed at a desired tire circumferential position in the vulcanizer 9.

Alternatively, with the splice position (S1, S2, S3, or the like) of the tire component g used as a visible mark, the image acquisition machine 5 is used to acquire a side view image of the green tire G placed sideways on the cradle 13. Based on the acquired side view image, the position of the visible mark (S1, S2, S3, or the like) is calculated and identified by the calculation unit 3a. The identified position of the visible mark (S1, S2, S3, or the like) allows identification of the tire circumferential position (arrangement) of the green tire G placed on the cradle 13.

On the cradle 13, the rotating shaft 15a is rotated using the identified visible mark (S1, S2, S3, or the like) as a reference to perform the operation of varying the tire circumferential position, with respect to the vulcanizer 9, of the green tire G placed on the cradle 13, and the operation of adjusting the tire circumferential position of the green tire G to the tire circumferential position calculated by the calculation unit 3a (optimal tire circumferential position). Accordingly, the splice position of the predetermined tire component g of the green tire G can be disposed at a desired tire circumferential position in the vulcanizer 9.

Even in a case where this manufacturing device 1 is used, the transport machine 12 holding the green tire G sideways can be configured to be rotatable around the tire axial center CL of the held green tire G. Then, the position of the visible mark on the side surface of the green tire G held by the transport machine 12 can be identified based on the side view image of the green tire G acquired by the image acquisition machine 5, and the tire circumferential position (arrangement) of the green tire G held by the transport machine 12 can be identified. Then, the transport machine 12 is rotated around the tire axial center CL of the held green tire G based on the identified visible mark to allow execution of the operation of varying the tire circumferential position of the green tire G with respect to the vulcanizer 9 and the operation of adjusting the tire circumferential position of the green tire G to the tire circumferential direction calculated by the calculation unit 3a (optimal tire circumferential position).

The invention claimed is:

1. A method for manufacturing a tire, comprising:
   manufacturing a tire by feeding, using an arrangement mechanism, each of a plurality of green tires having an identical specification into a respective one of a plurality of identical vulcanizers, with a tire circumferential position of each of the plurality of green tires varied with respect to the respective vulcanizer, and by vulcanizing each of the plurality of green tires;
   storing, in a storage unit for each of the plurality of tires manufactured, characteristic value data of a dynamic balance value and feed position data identifying the tire circumferential position of each of the plurality of green tires with respect to the respective vulcanizer during feeding into the respective vulcanizer, and calculating by using a calculation unit, based on the characteristic value data and the feed position data stored in the storage unit, the tire circumferential position of each of the plurality of green tires with respect to the respective vulcanizer at which a characteristic value related to the characteristic value data stored in the storage unit is brought within a tolerance range; and
   feeding, into the respective vulcanizer, each of the plurality of green tires to be newly vulcanized while adjusting, by using the arrangement mechanism, the tire circumferential position of each of the plurality of green tires with respect to the respective vulcanizer to the tire circumferential position calculated by the calculation unit.

2. The method for manufacturing a tire according to claim 1, comprising disposing each of the plurality of green tires on the arrangement mechanism with a tire circumferential position of a splice position of a predetermined tire component kept constant with respect to the arrangement mechanism.

3. The method for manufacturing a tire according to claim 1, comprising:
   presetting a visible mark on a tire side surface of each of the plurality of green tires, detecting the visible mark with each of the plurality of green tires disposed on the arrangement mechanism; and
   performing, based on the visible mark detected, an operation of varying the tire circumferential position of each of the plurality of green tires with respect to the respective vulcanizer and an operation of adjusting the tire circumferential position of each of the plurality of green tires to the tire circumferential position being calculated.

4. The method for manufacturing a tire according to claim 3, comprising determining, in advance, tire circumferential relative positions of the visible mark and a splice position of a predetermined tire component of each of the plurality of green tires to which the visible mark is applied.

5. The method for manufacturing a tire according to claim 1, wherein
   the arrangement mechanism comprises a cradle on which each of the plurality of green tires is placed sideways, and
   the arrangement mechanism performs, with rotating the cradle around a tire axial center of each of the plurality of green tires being placed, an operation of varying the tire circumferential position of each of the plurality of green tires with respect to the respective vulcanizer and the operation of adjusting the tire circumferential position of each of the plurality of green tires to a tire circumferential direction being calculated.

6. The method for manufacturing a tire according to claim 1, wherein
   the arrangement mechanism comprises a transport machine holding each of the plurality of green tires sideways and feeding each of the plurality of green tires into the respective vulcanizer, and
   the arrangement mechanism performs, with rotating the transport machine around a tire axial center of each of the plurality of green tires being held, an operation of varying the tire circumferential position of each of the plurality of green tires with respect to the respective vulcanizer and the operation of adjusting the tire circumferential position of each of the plurality of green tires to a tire circumferential direction being calculated.

7. The method for manufacturing a tire according to claim 4, wherein
the arrangement mechanism comprises a cradle on which each of the plurality of green tires is placed sideways, and
the arrangement mechanism performs, with rotating the cradle around a tire axial center of each of the plurality of green tires being placed, the operation of varying the tire circumferential position of each of the plurality of green tires with respect to the respective vulcanizer and the operation of adjusting the tire circumferential position of each of the plurality of green tires to a tire circumferential direction being calculated.

8. The method for manufacturing a tire according to claim 4, wherein
the arrangement mechanism comprises a transport machine holding each of the plurality of green tires sideways and feeding each of the plurality of green tires into the respective vulcanizer, and
the arrangement mechanism performs, with rotating the transport machine around a tire axial center of each of the plurality of green tires being held, the operation of varying the tire circumferential position of each of the plurality of green tires with respect to the respective vulcanizer and the operation of adjusting the tire circumferential position of each of the plurality of green tires to a tire circumferential direction being calculated.

9. The method of manufacturing a tire according to claim 1, comprising storing, in a storage unit for each of the plurality of tires manufactured, characteristic value data of a uniformity value and the dynamic balance value.

10. A device for manufacturing a tire, comprising: a vulcanizer that vulcanizes a green tire; an arrangement mechanism that feeds the green tire into the vulcanizer; a control unit configured to control movement of the arrangement mechanism; a calculation unit; and a storage unit,
the storage unit being configured to store, for each of a plurality of tires manufactured by feeding, using the arrangement mechanism, each of a plurality of green tires having an identical specification into the vulcanizer, with tire circumferential positions of each of the plurality of green tires varied with respect to the vulcanizer, characteristic value data of a dynamic balance value and feed position data identifying the tire circumferential position of each of the plurality of green tires with respect to the vulcanizer during feeding into the vulcanizer,
the calculation unit being configured to calculate, based on the characteristic value data and the feed position data stored in the storage unit, the tire circumferential position of each of the plurality of green tires with respect to the vulcanizer at which a characteristic value related to the characteristic value data stored in the storage unit is brought within a tolerance range, and
in a case where each of the plurality of green tires is newly vulcanized, the control unit being configured to control the arrangement mechanism to adjust the tire circumferential position of each of the plurality of green tires with respect to the vulcanizer to the tire circumferential position calculated by the calculation unit, and to feed each of the plurality of green tires into the vulcanizer.

11. The device for manufacturing a tire according to claim 10, wherein, the characteristic value data includes a uniformity value and the dynamic balance value.

* * * * *